United States Patent
Lazaridis (10) Patent No.: US 8,606,881 B2
(45) Date of Patent: Dec. 10, 2013

(54) BOOKMARK BEACON SYSTEM AND METHOD

(75) Inventor: Mihal Lazaridis, Waterloo (CA)

(73) Assignee: BlackBerry Limited (CA)

( * ) Notice: Subject to any disclaimer, the term of this patent is extended or adjusted under 35 U.S.C. 154(b) by 275 days.

(21) Appl. No.: 12/560,738

(22) Filed: Sep. 16, 2009

(65) Prior Publication Data

US 2010/0005002 A1    Jan. 7, 2010

Related U.S. Application Data

(62) Division of application No. 11/182,342, filed on Jul. 15, 2005, now abandoned, which is a division of application No. 09/929,375, filed on Aug. 14, 2001, now Pat. No. 7,000,001.

(60) Provisional application No. 60/232,037, filed on Sep. 12, 2000.

(51) Int. Cl.
    *G06F 15/16* (2006.01)
    *G06Q 20/00* (2012.01)

(52) U.S. Cl.
    USPC ............. 709/219; 705/16; 705/17; 705/21

(58) Field of Classification Search
    USPC .......................................... 709/217, 223, 250
    See application file for complete search history.

(56) References Cited

U.S. PATENT DOCUMENTS

| | | | |
|---|---|---|---|
| 5,402,106 A | 3/1995 | DiPaolo et al. | |
| 5,444,763 A * | 8/1995 | Lazaridis et al. | 455/403 |
| 5,615,110 A * | 3/1997 | Wong | 705/38 |
| 5,640,002 A | 6/1997 | Ruppert et al. | |
| 5,678,010 A * | 10/1997 | Pittenger et al. | 705/44 |
| 5,732,346 A * | 3/1998 | Lazaridis et al. | 455/406 |
| 5,734,839 A * | 3/1998 | Enoki et al. | 705/20 |
| 5,929,848 A * | 7/1999 | Albukerk et al. | 715/700 |
| 5,930,472 A * | 7/1999 | Smith | 709/203 |
| 6,091,956 A | 7/2000 | Hollenberg | |
| 6,219,696 B1 * | 4/2001 | Wynblatt et al. | 709/218 |
| 6,275,142 B1 | 8/2001 | Paleiov et al. | |
| 6,484,148 B1 | 11/2002 | Boyd | |
| 6,493,760 B1 | 12/2002 | Pendlebury et al. | |
| 6,515,988 B1 | 2/2003 | Eldridge et al. | |
| 6,539,422 B1 | 3/2003 | Hunt et al. | |
| 6,550,672 B1 * | 4/2003 | Tracy et al. | 235/383 |
| 6,587,835 B1 * | 7/2003 | Treyz et al. | 705/14.64 |
| 6,604,038 B1 | 8/2003 | Lesesky et al. | |

(Continued)

FOREIGN PATENT DOCUMENTS

EP    0779756 A2    6/1997

OTHER PUBLICATIONS

"U.S. Appl. No. 09/929,375, Notice of Allowance mailed May 19, 2005", 12 pgs.

(Continued)

*Primary Examiner* — Backhean Tiv
(74) *Attorney, Agent, or Firm* — Schwegman Lundberg Woessner P.A.

(57) ABSTRACT

A bookmark beacon system comprises a computer network, a wireless network configured to enable a wireless device to access the computer network, and a bookmark beacon that transmits a bookmark data packet to the wireless device. The bookmark data packet includes a resource address that enables the wireless device to retrieve information stored on the computer network.

18 Claims, 6 Drawing Sheets

(56) References Cited

U.S. PATENT DOCUMENTS

| | | |
|---|---|---|
| 6,684,088 B1 | 1/2004 | Halahmi |
| 6,687,745 B1 * | 2/2004 | Franco et al. .................. 709/219 |
| 6,690,887 B1 | 2/2004 | Sano |
| 6,727,930 B2 | 4/2004 | Currans et al. |
| 6,886,742 B2 * | 5/2005 | Stoutenburg et al. ......... 235/379 |
| 6,941,270 B1 * | 9/2005 | Hannula .......................... 705/76 |
| 7,000,001 B2 * | 2/2006 | Lazaridis ...................... 709/217 |
| 7,024,385 B1 * | 4/2006 | Adcock et al. .................. 705/37 |
| 7,107,078 B2 * | 9/2006 | Lehto ............................. 455/566 |
| 7,200,566 B1 | 4/2007 | Moore et al. |
| 7,248,855 B2 * | 7/2007 | Joyce et al. ................... 455/406 |
| 7,343,351 B1 * | 3/2008 | Bishop et al. ................... 705/67 |
| 7,386,471 B1 * | 6/2008 | Nack ................................ 705/21 |
| 7,478,065 B1 * | 1/2009 | Ritter et al. .................... 705/39 |
| 7,502,838 B2 * | 3/2009 | Franco et al. .................. 709/219 |
| 7,529,563 B1 * | 5/2009 | Pitroda .......................... 455/558 |
| 8,190,514 B2 * | 5/2012 | Bishop et al. ................... 705/38 |
| 2001/0055978 A1 | 12/2001 | Herrod et al. |
| 2002/0030579 A1 * | 3/2002 | Albert et al. .................... 340/5.9 |
| 2002/0032746 A1 * | 3/2002 | Lazaridis ...................... 709/217 |
| 2002/0035539 A1 * | 3/2002 | O'Connell ...................... 705/39 |
| 2002/0046185 A1 * | 4/2002 | Villart et al. .................... 705/64 |
| 2002/0065728 A1 | 5/2002 | Ogasawara |
| 2002/0065774 A1 * | 5/2002 | Young et al. .................... 705/41 |
| 2003/0055735 A1 * | 3/2003 | Cameron et al. ................ 705/26 |
| 2003/0088460 A1 * | 5/2003 | Riordan et al. ................. 705/10 |
| 2004/0199574 A1 * | 10/2004 | Franco et al. .................. 709/201 |
| 2005/0086177 A1 * | 4/2005 | Anderson et al. .............. 705/64 |
| 2005/0131816 A1 * | 6/2005 | Britto et al. .................... 705/39 |
| 2005/0182714 A1 * | 8/2005 | Nel .................................. 705/39 |
| 2005/0250489 A1 * | 11/2005 | Lazaridis .................... 455/426.1 |
| 2006/0089880 A1 | 4/2006 | Merriman et al. |
| 2007/0027803 A1 * | 2/2007 | Brandes et al. ................. 705/39 |
| 2009/0125429 A1 * | 5/2009 | Takayama ....................... 705/35 |
| 2009/0299841 A1 * | 12/2009 | Bishop et al. .............. 705/14.21 |
| 2010/0005002 A1 * | 1/2010 | Lazaridis ........................ 705/17 |

OTHER PUBLICATIONS

"U.S. Appl. No. 09/929,375, Restriction Requirement mailed Jan. 13, 2005", 16 pgs.

"U.S. Appl. No. 09/929,375, Restriction Requirement mailed Nov. 5, 2004", 5 pgs.

"U.S. Appl. No. 09/929,375, Supplemental Notice of Allowance mailed Aug. 23, 2005", 3 pgs.

"Canadian Application Serial No. 2,356,301, Office Action mailed Sep. 19, 2003", 3 pgs.

"Canadian Application Serial No. 2,356,301, Response filed Dec. 30, 2003 to Office Action mailed Sep. 19, 2003", 4 pgs.

"Canadian Application Serial No. 2,507,852, Office Action mailed Jan. 6, 2009", 1 pg.

"Canadian Application Serial No. 2,507,852, Office Action mailed Apr. 15, 2008", 2 pgs.

"Canadian Application Serial No. 2,507,852, Response filed Apr. 24, 2009 to Office Action mailed Jan. 6, 2009", 2 pgs.

"Canadian Application Serial No. 2,507,852, Response filed Oct. 15, 2008 to Office Action mailed Apr. 15, 2008", 3 pgs.

* cited by examiner

BOOKMARK BEACON SYSTEM AND METHOD

CROSS-REFERENCE TO RELATED APPLICATION

This is a divisional of U.S. patent application Ser. No. 11/182,342, which is a divisional of U.S. patent application Ser. No. 09/929,375, filed on Aug. 14, 2001 and issued as U.S. Pat. No. 7,000,001. U.S. patent application Ser. No. 09/929,375 claims priority from and is related to the following prior application: Bookmark Beacon Method and System, U.S. Provisional Application No. 60/232,037 filed Sep. 12, 2000. These prior applications, including the entire written description and drawing figures, are hereby incorporated into the present application by reference.

BACKGROUND

1. Field of the Invention

This invention relates generally to an information beacon. More particularly, the invention provides a system and method for a bookmark beacon that enables communication with any device having access to a computer network, such as the Internet. The invention is particularly well-suited for communicating with Personal Digital Assistants, mobile communication devices, cellular telephones, and wireless two-way e-mail communication devices (collectively referred to hereinafter as "wireless devices").

2. Description of the Related Art

Communication between a wireless device and traditionally non-wireless equipment, such as printers, facsimile machines, ATMs, etc., currently requires the equipment to be specially manufactured with wireless capabilities, such as a Bluetooth® interface. Bluetooth® is a de facto standard, as well as a specification for small-form factor, low-cost, short-range radio links between wireless devices. The manufacture of wireless-enabled equipment, however, involves increased cost, additional power consumption, and relatively complex hardware.

SUMMARY

A bookmark beacon system comprises a computer network, a wireless network configured to enable a wireless device to access the computer network, and a bookmark beacon that transmits a bookmark data packet to the wireless device. The bookmark data packet includes a resource address that enables the wireless device to retrieve information stored on the computer network.

DETAILED DESCRIPTION

Figure 1:
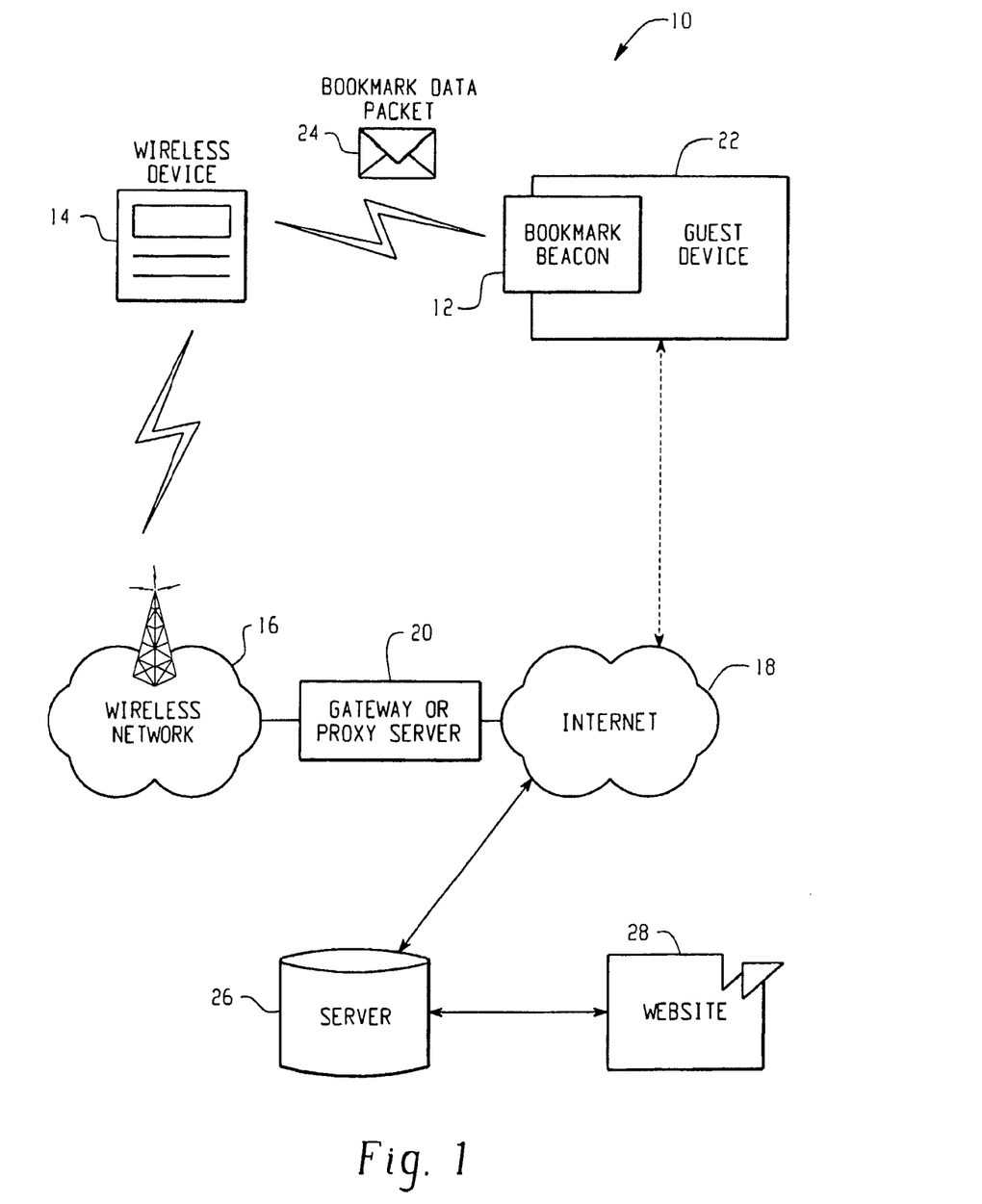
FIG. 1 is a block diagram of an exemplary bookmark beacon system according to one embodiment of the claimed invention.

Referring now to the figures, FIG. 1 is a block diagram of an exemplary bookmark beacon system 10. The system 10 includes a bookmark beacon 12, a wireless device 14, and a wireless communications network 16 through which the wireless device 14 can access the Internet 18 via a proxy server 20. In addition, the bookmark beacon 12 may be physically coupled with, or in close proximity to, a guest device 22.

Operationally, the bookmark beacon 12 transmits a bookmark data packet 24 to the wireless device 14, including information that is used by the wireless device 14 to access a network server 26 having a website 28 associated with the guest device 22. Through an Internet connection, the wireless device 14 may, for example, communicate with the guest device 22, retrieve information relating to the guest device 22, or interact with applications associated with the guest device 22. Alternatively, if the guest device 22 has a network connection, the bookmark data packet 24 may provide the wireless device 14 with the information necessary to directly access the guest device 22 (such as an IP address for the guest device 22). It should be understood, however, that the bookmark beacon system 10 is not limited to use with the Internet 18, but may be implemented using any computer network, such as a corporate Intranet or a large network operator.

The guest device 22 may be any type of device or structure, such as a store front, a printer, a facsimile machine, an ATM, or a cash register. Various embodiments of the bookmark beacon system 10 utilizing different types of guest devices are described in detail herein. Alternatively, the bookmark beacon system 10 may be implemented without a guest device 22. For instance, a bookmark beacon 12 could be used independently to communicate information, such as an advertisement, to a nearby wireless device 14.

The bookmark data packet 24 transmitted by the bookmark beacon 12 preferably includes a resource address, such as an IP address or a Uniform Resource Locator (URL), that enables the wireless device 14 to locate a network server 26 and website 28 over the Internet 18. Alternatively, the resource address may enable a network connection directly to the guest device 22. The data packet 24 may also include a limited amount of text describing the purpose of the bookmark beacon 12. The descriptive text preferably enables a wireless device user to determine if he or she is interested in further interaction with the system 10. In addition, the data packet 24 may further include data relating to the wireless device user's interaction with the guest device 22. For example, the data packet 24 might identify a cash register and the price of merchandise purchased by the wireless device user. In any case, the data packet 24 is preferably a short data stream that does not impose a heavy transmission demand on the bookmark beacon 12.

Upon receiving the bookmark data packet 24, the mobile device user is preferably given the option to then access the server 26 and website 28 or the guest device 22 identified by the resource address. Communication with the Internet is preferably achieved through an existing wireless network 16 and proxy server 20. Communications across the wireless network 16 and proxy server 20 involve operations that are commonly understood by those skilled in the art of wireless communications. Communication across the wireless network connection 16 may be facilitated on the wireless device 14 using any known software that is capable of interfacing the wireless device 14 with the proxy server 20. The proxy server 20 is then used as a gateway that allows the wireless device 22 to indirectly communicate with the website 28 or guest device 22 over the network connection. The proxy server 20 preferably communicates with the target website 28 through a Hypertext Transfer Protocol (HTTP) fetch and cache component. The target website 28 relating to the guest device 22 may operate on a range of computers, computer systems, or networks. For example, information or software applications relating to the guest device 22 could be stored in local databases, on an Intranet, or on the Internet 18. The fetch and cache component of the proxy server 20 stores the web pages that are returned from the website 28 in response to commands by the wireless device user. A wireless transport layer at the proxy server 20 then transmits the information through the wireless network connection 16 to the mobile device 14.

Figure 2:
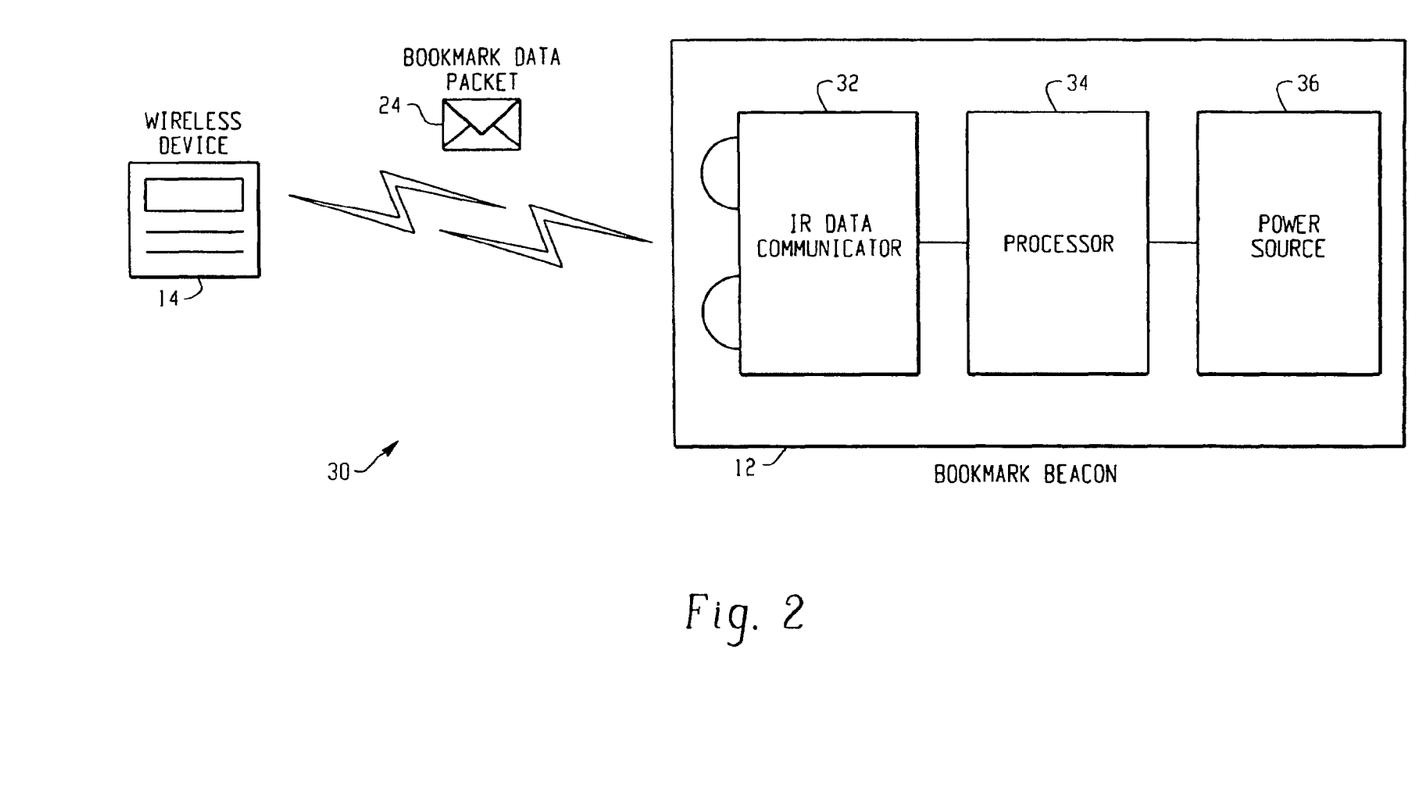
FIG. 2 is a block diagram showing one exemplary embodiment of the bookmark beacon.

FIG. 2 is a block diagram 30 showing one exemplary embodiment of the bookmark beacon 12. The exemplary bookmark beacon 12 comprises a short-range serial infrared data communicator 32, a microprocessor 34, and a power source 36. The bookmark beacon 12 is preferably a wireless-enabled tag that uses the short-range serial infrared data communicator 32 to transmit the bookmark data packets 24. The data communicator 32 is preferable an IrDA (Infrared Data Association) port coupled to a microprocessor 34. The IrDA standard has been widely accepted throughout the wireless industry as a means of realizing low-power, non-interfering, interoperable data links. As a result, many commercially-available wireless devices include IrDA ports. It should be understood, however, that the bookmark beacon 12 could be implemented using any known means for transmitting data to a wireless device, such as a radio frequency transmitter. The power source 36 is preferably a battery, but could be any type of power source capable of supplying sufficient power to the processor 34.

Operationally, the processor 34 is programmed to contain the data to be included in the bookmark data packet 24. The processor 34 may, for example, be programmed through a small keyboard attached to the housing of the bookmark beacon 12, or through an external electrical interface such as a serial port, or by any means of communicating data to the bookmark beacon 12. The processor then transmits the data packet 24 through the IrDA port 32 for reception by any mobile device within wireless communication range. This transmission may be a continuous transmission, or may be configured to transmit at a periodic interval.

In an alternative embodiment, the bookmark beacon 12 may be implemented using a standard personal computer (PC) configured with an IrDA port. The transmission of data through IrDA ports is commonly understood by those skilled in the art, and is described in the "IrDA-Compatible Data Transmission Design Guide," TELEFUNKEN Microelectronic GmbH, April 1996.

Figure 3:
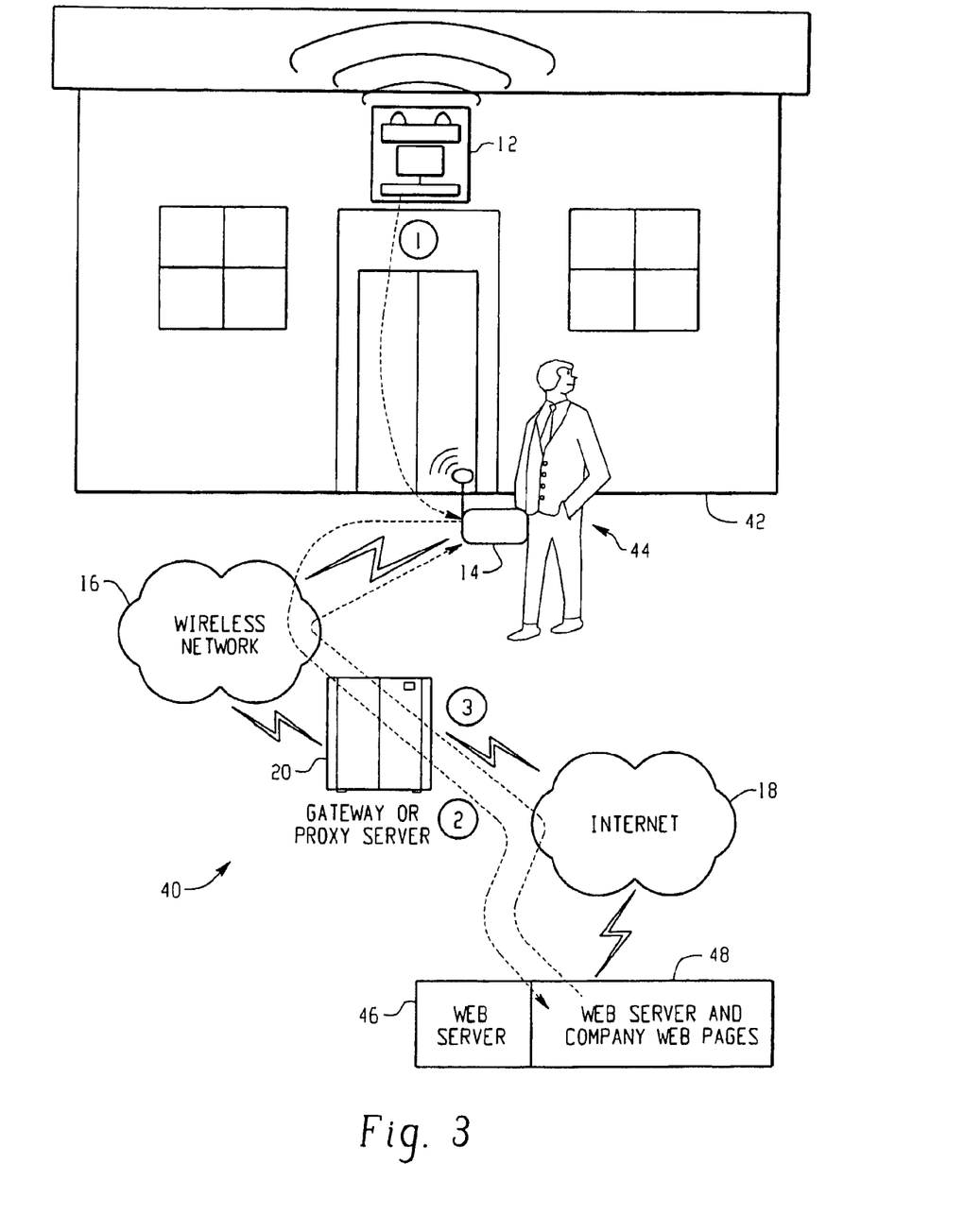
FIG. 3 is an illustrative diagram showing an exemplary embodiment of the bookmark beacon system in which the bookmark beacon is associated with a physical location such as a commercial establishment.

FIG. 3 is an illustrative diagram showing an exemplary embodiment 40 of the bookmark beacon system 10 in which the bookmark beacon 12 is associated with a physical location, such as a commercial establishment 42. In this embodiment 40, the bookmark beacon 12 is preferably mounted on or near the commercial establishment 42. When a wireless device user 44 approaches the establishment 42, his or her wireless device 14 receives a bookmark data packet 24 from the bookmark beacon 12. The bookmark data packet 24 may then be used by the wireless device user 44 to retrieve information relating to the commercial establishment 42.

Step 1, identified in FIG. 3 by a number one (1) enclosed in a circle, illustrates the transmission of the bookmark data packet 24 from the bookmark beacon 12 to the wireless device 14. This transmission may occur automatically as the wireless device user 44 approaches or enters the establishment 42. Alternatively, the user may select a function on his or her wireless device 14 that instructs the device 14 to receive bookmark beacon signals. If the wireless device user 44 chooses to interact with the system 40, then in step 2 the bookmark data packet 24 is used to access a web server 46 that includes web pages 48 containing information relating to the commercial establishment 42. As discussed above with respect to FIG. 1, the web server 46 and web pages 48 are preferably accessed by the wireless device 14 through a wireless network 16 that is linked to the Internet 18 by a proxy server 20. Once the web pages 48 are accessed by the proxy server 20, information relating to the commercial establishment 42 is collected, and the information is delivered to the wireless device 14 in step 3. The information delivered from the web pages could include, for example, advertisements, sales, or any other information relating to the commercial establishment.

In other exemplary embodiments of the bookmark beacon system 10, the bookmark beacon 12 may be associated with, for example, a cash register in a restaurant, a facsimile machine, a printer, a secure door, or even a tree. These exemplary embodiments are described below to illustrate the various configurations (and/or guest devices) well within the scope of the bookmark beacon system. It should be understood, however, that the bookmark beacon system is not limited to these exemplary embodiments, but may be utilized in a wide variety of applications.

1. Cash Register Example—At a restaurant, a mobile device user orders a meal (order A) and sits at table B. A waiter enters order A into a cash register with a web browser interface. The order and amounts owing are managed and maintained securely stored on a web page that is reserved for orders relating to table B. The wireless device user then completes his or her meal and initiates communication with a bookmark beacon, attached to table B, that provides the mobile device with a bookmark data packet identifying the web page associated with table B. The mobile device then accesses the web page as described above. Upon receiving the preferably secure web page, the user may, for example, be able to review his or her order, confirm the order and complete payment for such transaction. The bookmark data packet utilized in this exemplary embodiment may comprise the following information:
www.domain.tld{ID}
Wherein: www.domain.tld=resource address containing order information; and
ID=table identifier 2. Facsimile Machine Example—A wireless device user approaches a facsimile machine that has an attached bookmark beacon. The user's wireless device then receives a bookmark data packet from the bookmark beacon attached to the facsimile machine that preferably includes a resource address containing the URL of a webpage associated with the facsimile machine. The webpage may contain, for example, the facsimile number, owner, physical address and possibly the IP address of the facsimile machine. Once the resource address has been obtained, the wireless device may, for example, send data wirelessly to the fax machine using the facsimile number, or send data to the facsimile machine over the network using the IP address. In an alternative embodiment, the bookmark data packet may contain the resource address enabling the wireless device to transmit data over the network directly to the facsimile machine without first accessing a related web page. Advantageously, this example enables legacy facsimile machines (i.e., facsimile machines that are not wireless enabled) to communicate with mobile devices.

3. Printer Example—A wireless device user approaches a computer printer that has an attached bookmark beacon. The user's wireless device then receives a bookmark data packet from the bookmark beacon that preferably includes the URL of a web page that provides the wireless device with the necessary protocols to communicate with the printer. The webpage may include, for example, the owner, physical address and IP address of the printer as well as a printer driver for communication with the printer. Once the printer information has been obtained, the wireless device may, for example, transmit data to the printer over the network using the IP address. In an alternative embodiment, the bookmark data packet may contain the printer information, enabling the wireless device to communicate directly with the printer without first accessing a web page. Advantageously, this example enables legacy printers (i.e., printers that are not wireless enabled) to communicate with mobile devices such that a user may print out documents from the mobile device without first having to forward the document to the wired network on which the printer is attached.

4. Secure Door Example—A wireless device user approaches a door having an attached security-featured bookmark beacon. The wireless device user then initiates communication with the bookmark beacon, and the bookmark beacon provides the mobile device with a bookmark data packet identifying a web page. The bookmark data packet in this exemplary embodiment may, for example, comprise the following information:
www.domain.tld{ID:PS}
Wherein: www.domain.tld=resource address containing order information
ID=door identifier
PS=password The bookmark beacon password is preferably generated in synchronization with a server-based password. Once the mobile device has accessed the preferably secure web page, the mobile device submits a secure password to the server. If the password submitted by the mobile device and the password encoded in the bookmark data packet are synchronized with the server-based password, then the door is unlocked.

Figure 4:
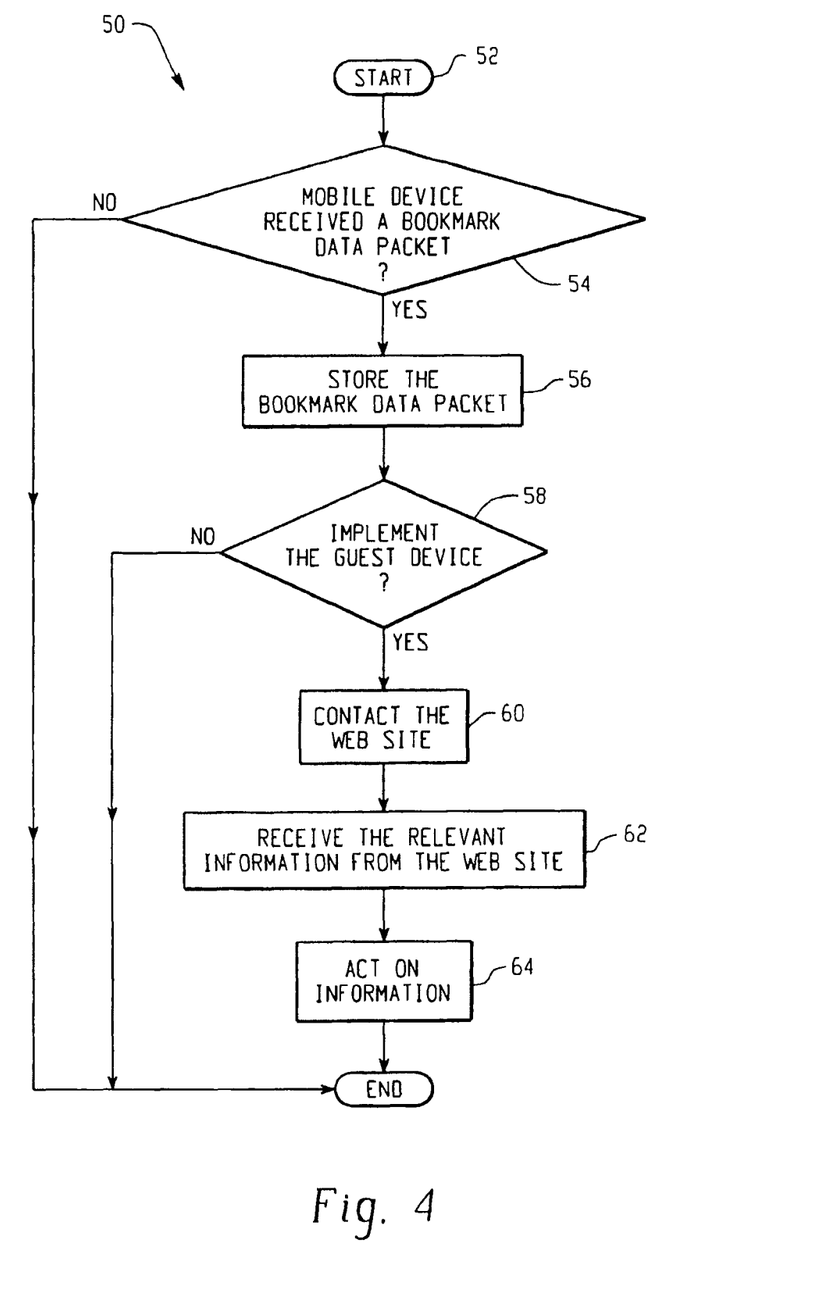
FIG. 4 is a flow diagram showing an exemplary method for retrieving information on a wireless device relating to a guest device having a bookmark beacon.

5. Tree Example—To illustrate the wide array of applications of the bookmark beacon system, the system may be applied to such a simple item as a tree. In this exemplary embodiment, a bookmark beacon is embedded on a tree. The bookmark beacon then transmits a resource address pointing any mobile device to a web site describing the features and history of the tree and any other particular information about the tree's species to the user. In this example, the bookmark data packet may, for example, comprise the following information:
www.domain.tld
Wherein www.domain.tld=resource address containing tree information FIG. 4 is a flow diagram showing an exemplary method 50 for retrieving information on a wireless device relating to a guest device having a bookmark beacon. The method begins at step 52 when a wireless device comes within proximity of a bookmark beacon. In step 54 the bookmark beacon transmits a bookmark data packet that is received by the wireless device. Once the bookmark data packet is received, the wireless device stores the bookmark data packet to enable a wireless device user to retrieve the information necessary to communicate with the guest device (step 56). If the wireless device user chooses to interact with (or receive information concerning) the guest device (step 58), then the mobile device contacts a web site identified by the bookmark data packet (step 60). In step 62, the web site preferably determines the relevant information regarding the guest device such as protocols and drivers that the user requires, and then downloads that information to the user's mobile device. The information downloaded to the wireless device may preferably be in a variety of forms such as simple text, graphics and text, applets, forms, etc. Then, in step 64, the wireless device or wireless device user may act on the downloaded information as described herein.

Figure 5:
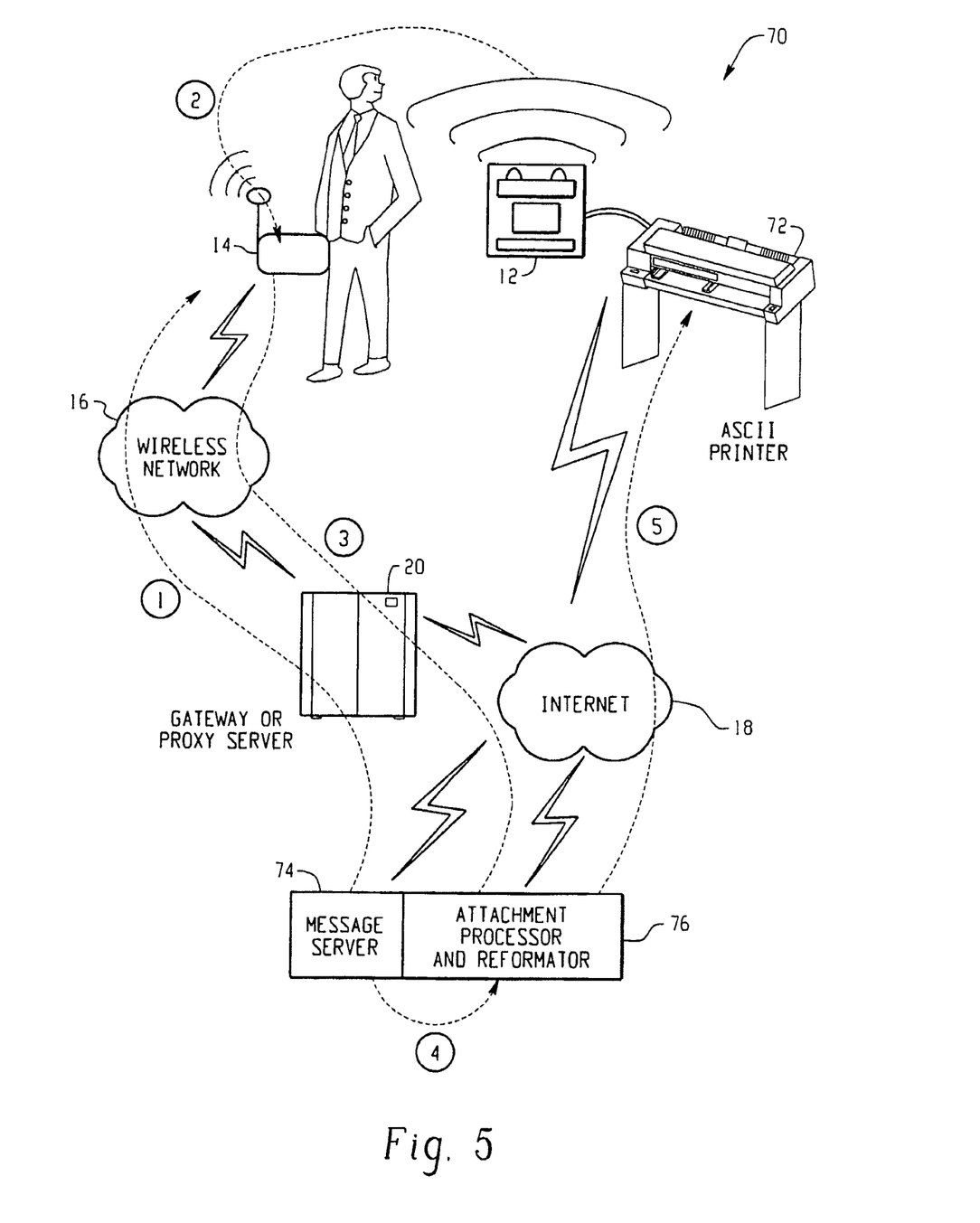
FIG. 5 is an illustrative diagram showing an exemplary electronic messaging system for wireless devices that utilizes a bookmark beacon associated with a network-enabled printer.

FIG. 5 is an illustrative diagram showing an exemplary electronic messaging system 70 for wireless devices 14 that utilizes a bookmark beacon 12 associated with a network-enabled printer 72. The system 70 includes a bookmark beacon 12 attached to, or in the vicinity of, a printer 72 that is coupled to the Internet 18 or some other computer network. The printer 72 is configured to receive print jobs across the Internet 18, preferably using an Internet Printing Protocol (IPP). Operationally, the system enables a wireless device user to forward e-mail attachments that cannot be viewed on the wireless device 14 over the Internet 18 to the network-enabled printer 72.

In step 1, identified in FIG. 5 by a number one (1) enclosed in a circle, a wireless device user receives an e-mail message from a messaging server 74 that includes attachments that the messaging server 74 is unable to forward to the wireless device 14. This restriction may, for example, be due to storage limitations, formatting problems or limited viewing capability on the mobile device 14. Once the wireless device user receives the e-mail message with a notification that an attachment could not be forwarded, the system 70 then preferably gives the user the option to print the attachment on a network-enabled printer 72. If the user chooses to print the attachment, then the wireless device 14 preferably (1) searches for a signal from a bookmark beacon 12, and (2) if a signal is identified, then receives the addressing and capability information for the printer 72 in the form of a bookmark data packet (step 2). Then, in step 3, the wireless device 14 transmits a print request along with the information contained in the bookmark beacon data packet to the message server 74. Once the print request and printer data are received, the message server 74 then preferably passes the information to an attachment processor and reformatting component 76 (step 4). The attachment processor and reformatting component 76 then preferably extracts the attachment from the e-mail message and reformats the attachment for printing. The reformatting operation may be performed, for example, using the PostScript printer formatting language. Once reformatting is complete, the attachment processor establishes communication with the printer 72 over the Internet 18, and transmits the attachment to the printer using the IPP method supported by the Internet network 18 (step 5). It should be understood, however, that other printer formats could be used and other printer protocols could be employed.

Figure 6:
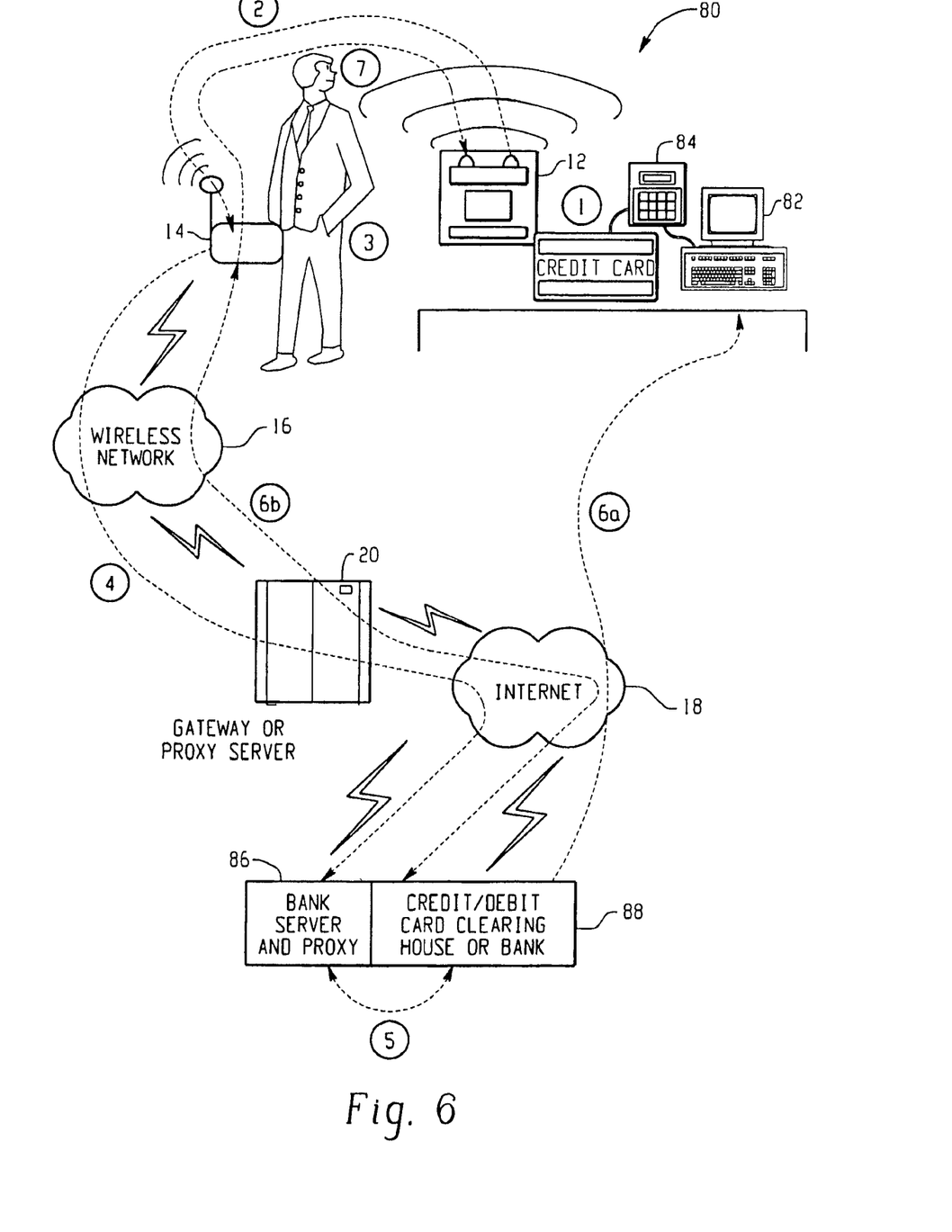
FIG. 6 is an illustrative diagram showing an exemplary electronic banking system that utilizes a bookmark beacon associated with a point-of-sale (POS) device.

FIG. 6 is an illustrative diagram showing an exemplary electronic banking system that utilizes a bookmark beacon associated with a point-of-sale (POS) device. The system includes a bookmark beacon 12 attached to, or in the vicinity of, a POS device 84 that is coupled to the Internet 18 or some other computer network. Operationally, this system may be used, for example, to authorize a credit or debit transaction for the purchase of some items.

Step 1, identified in FIG. 6 by a number one (1) enclosed in a circle, occurs when a wireless device user completes a sale of some form and is not paying cash. At the retail sale point there is a cash register 82 and a point-of-sale (POS) device 84. The POS device 84 may, for example, include a debit machine, a credit machine or a combination of both. In step 1, the POS device 84 preferably receives the amount of the sale and type of transaction from the cash register 82, and requires the wireless device user to enter a Personal Identification Number (PIN). Then, in step 2, the information received by the POS device 84 is transferred from the POS device 84 to the bookmark beacon 12, and transmitted to the user's wireless device 14 in the form of a bookmark beacon data packet. In addition, the bookmark beacon data packet preferably includes the Internet address of a Bank Server and Proxy 86 associated with the POS device 84, which is configured to process the transaction. Once the bookmark beacon data packet is received at the wireless device 14, the wireless device user preferably reviews the information and accepts or denies the transaction at step 3. If the wireless device user accepts the transaction, then in step 4, the transaction request is delivered over wireless network 16 and Internet 18 to the Bank Server and Proxy 86. The Bank Server and Proxy 86 then, in step 5, transfers the transaction information to the network location 88 of a bank or a credit/debit clearing house that records the wireless device user's account information and verifies the PIN validity. If the transaction information is verified, then the bank or clearing house 88 accepts the transaction by transmitting the necessary information directly to the POS device 84 over the Internet 18 (step 6*a*).

In an alternative embodiment, the bookmark beacon 12 includes a bi-directional IrDA or RF interface utilized to avoid the need for a land-line link between the bank or clearing house 88 and every retail outlet. In this embodiment, the verification information from the bank or clearing house 88 is transmitted back to the wireless device 14 in the form of an encoded verification message as shown in step 6*b*. Then, in step 7, the encoded message is transmitted by the wireless device 14 to the bi-directional interface of the bookmark beacon 12. The verification message is then transferred to the POS device 84 where the transaction is completed.

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences form the literal language of the claims.

I claim:

1. A method for enabling a point-of-sale device to communicate with a wireless device, comprising the steps of:
providing a computer network;
providing a network connection between the computer network and the point-of-sale device;
entering information relating to a transaction into the point-of-sale device;
storing the information relating to the transaction at a location on the computer network;
providing a wireless network configured to enable the wireless device to access the computer network;
providing a bookmark beacon associated with the point-of-sale device that transmits a bookmark data packet, wherein the bookmark data packet includes a resource address that identifies the location on the computer network where the information relating to the transaction is stored;
receiving the bookmark data packet on the wireless device;
accessing the computer network with the wireless device, using the bookmark data packet received by the wireless device, wherein the computer network is accessed by the wireless device to transmit a transaction request for the transaction at the point-of-sale device; and
in response to verification of the transaction by the computer network, providing a verification message to the point-of-sale device to complete the transaction, wherein the verification message is transmitted by the computer network to the wireless device and the wireless device transmits the verification message to the bookmark beacon associated with the point-of-sale device.

2. The method of claim 1, comprising the further step of:
transmitting credit or debit information from the wireless device to the computer network.

3. The method of claim 2, comprising the further step of:
providing software executing on the computer network, wherein the software (1) receives the credit or debit information from the wireless device, (2) approves or denies the transaction based on the credit or debit information, and (3) transmits the approval or denial to the point-of-sale device.

4. The method of claim 3, wherein the information relating to the transaction is included in the bookmark data packet and is transmitted to the software along with the credit or debit information.

5. The method of claim 1 wherein the accessing includes accessing the computer network with the wireless device to confirm the transaction.

6. The method of claim 1 wherein the accessing includes accessing the computer network with the wireless device to complete payment for the transaction.

7. The method of claim 6 further comprising, after said accessing: receiving, by the point-of-sale device from the computer network, additional information relating to verification of the payment.

8. A method performed on a computer network, comprising:
receiving information, relating to a transaction, entered into a point-of-sale device;
storing the information at a computer network location on the computer network;
transmitting, through a bookmark beacon associated with the point-of-sale device, to a mobile wireless device, a data packet that includes a resource address of the computer network location;
providing the information to the wireless device when the wireless device accesses the computer network location using the data packet received by the wireless device, wherein the computer network location is accessed by the wireless device to transmit a transaction request for the transaction at the point-of-sale device;
receiving credit or debit information from the wireless device;
approving or denying the transaction based on the credit or debit information; and
transmitting the approval or denial to the point-of-sale device, wherein the approval or denial is transmitted by the computer network to the wireless device and the wireless device transmits the approval or denial to the bookmark beacon associated with the point-of-sale device.

9. A method of completing a point-of-sale (POS) transaction with a wireless device, comprising:

receiving a bookmark beacon data packet on the wireless device over a short-range wireless link from a bookmark beacon, the bookmark beacon data packet including transaction information and a network address for a computer associated with a financial institution, and the transaction information having been received by the bookmark beacon from a POS device;

displaying the transaction information on the wireless device;

receiving an acceptance of the POS transaction on the wireless device;

in response to receiving the acceptance of the POS transaction, using the network address to transmit a transaction request from the wireless device to the computer associated with the financial institution, the transaction request being transmitted over a wireless network from the wireless device to an internet and over the internet to the computer associated with the financial institution; and in response to verification of the POS transaction by the computer, providing a verification message for the transaction to the POS device to complete the POS transaction, wherein the verification message is received by the wireless device from the computer and the wireless device transmits the verification message to the bookmark beacon associated with the POS device.

10. The method of claim 9, further comprising:

transmitting an acceptance or denial of the transaction request over the internet from the computer associated with the financial institution to the POS device to complete the POS transaction.

11. The method of claim 10, wherein the POS device is a debit machine, a credit machine or a combination of a debit machine and a credit machine.

12. The method of claim 9, wherein the transaction request is transmitted over the wireless network from the wireless device to a proxy server and over the internet from the proxy server to the computer associated with the financial institution.

13. The method of claim 9, wherein the short-range wireless link is an infrared data link.

14. A system for completing a point-of-sale (POS) transaction, comprising:

a POS device to receive sale information relating to the POS transaction; and a bookmark beacon coupled to the POS device to receive the transaction information from the POS device and generate a bookmark beacon data packet that includes the transaction information and a network address for a computer associated with a financial institution, the bookmark beacon including short-range wireless communications circuitry to transmit the bookmark beacon data packet over a short-range wireless link to a wireless device; and the wireless device being configured to display the transaction information from the bookmark beacon data packet, receive an acceptance of the POS transaction, and in response to receiving the acceptance of the POS transaction, use the network address to transmit a transaction request from the wireless device to the computer associated with the financial institution, the transaction request being transmitted over a wireless network from the wireless device to an internet and over the internet to the computer associated with the financial institution and wherein, in response to verification of the POS transaction by the computer, providing a verification message for the transaction to the POS device to complete the POS transaction, the verification message received by the wireless device from the computer and the wireless device transmits the verification message to the bookmark beacon associated with the POS device.

15. The system of claim 14, wherein the computer associated with the financial institution is configured to transmit an acceptance or denial of the transaction request over the internet to the POS device to complete the POS transaction.

16. The system of claim 14, wherein the POS device is a debit machine, a credit machine or a combination of a debit machine and a credit machine.

17. The system of claim 14, wherein the transaction request is transmitted over the wireless network from the wireless device to a proxy server and over the internet from the proxy server to the computer associated with the financial institution.

18. The system of claim 14, wherein the short-range wireless is an infrared data link.

* * * * *